United States Patent
Li et al.

(10) Patent No.: US 11,552,807 B2
(45) Date of Patent: Jan. 10, 2023

(54) DATA PROCESSING METHOD AND APPARATUS

(71) Applicant: Huawei Technologies Co., Ltd., Shenzhen (CN)

(72) Inventors: Guoqing Li, Shenzhen (CN); Xinmiao Chang, Beijing (CN); Jingqing Mei, Shenzhen (CN); Sishan Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 462 days.

(21) Appl. No.: 16/648,126

(22) PCT Filed: Sep. 18, 2017

(86) PCT No.: PCT/CN2017/102105
§ 371 (c)(1),
(2) Date: Mar. 17, 2020

(87) PCT Pub. No.: WO2019/051839
PCT Pub. Date: Mar. 21, 2019

(65) Prior Publication Data
US 2020/0235945 A1    Jul. 23, 2020

(51) Int. Cl.
*H04L 29/06* (2006.01)
*H04L 9/32* (2006.01)
*H04L 9/08* (2006.01)

(52) U.S. Cl.
CPC .......... *H04L 9/3268* (2013.01); *H04L 9/0819* (2013.01); *H04L 9/0891* (2013.01); *H04L 9/3226* (2013.01)

(58) Field of Classification Search
CPC ... H04L 9/3268; H04L 9/0819; H04L 9/0891; H04L 9/3226; H04L 9/3247; H04L 9/3263; H04W 12/08; H04W 12/35
See application file for complete search history.

(56) References Cited

U.S. PATENT DOCUMENTS

| | | |
|---|---|---|
| 2014/0143534 A1 | 5/2014 | Chastain et al. |
| 2014/0223510 A1 | 8/2014 | Brudnicki et al. |
| | (Continued) | |

FOREIGN PATENT DOCUMENTS

| | | |
|---|---|---|
| CN | 103282911 A | 9/2013 |
| CN | 103856485 A | 6/2014 |
| | (Continued) | |

OTHER PUBLICATIONS

Zhou, J., et al., "Analysis of Federation Identity Authentication across Security Domains in Cloud Service," Academic Research, Nov. 2012, 3 pages.
(Continued)

*Primary Examiner* — Yogesh Paliwal
(74) *Attorney, Agent, or Firm* — Conley Rose, P.C.

(57) ABSTRACT

A method includes sending, by a trusted application (TA) entity, a certificate of the TA entity and a private key signature of the TA entity to a target security domain (SD). The certificate and the private key signature enable the target SD to perform trust verification via a server, obtaining, by the TA entity, a first key of the target SD when the trust verification of the TA entity succeeds, and establishing, by the TA entity, a trust relationship with the target SD.

20 Claims, 5 Drawing Sheets

(56) References Cited

U.S. PATENT DOCUMENTS

| | | | |
|---|---|---|---|
| 2014/0245013 A1 | 8/2014 | Kim et al. | |
| 2014/0359295 A1* | 12/2014 | Saif | H04L 63/0442 |
| | | | 713/173 |
| 2015/0310432 A1* | 10/2015 | Pusuluri | G06Q 40/02 |
| | | | 705/71 |
| 2016/0099923 A1* | 4/2016 | Golla | H04L 63/168 |
| | | | 713/171 |
| 2016/0234176 A1 | 8/2016 | Chu et al. | |
| 2016/0286391 A1* | 9/2016 | Khan | G06Q 20/327 |
| 2016/0344560 A1* | 11/2016 | Caceres | H04W 12/04 |
| 2017/0109546 A1 | 4/2017 | Nerot | |

FOREIGN PATENT DOCUMENTS

| | | | | |
|---|---|---|---|---|
| CN | 104636666 A | | 5/2015 | |
| CN | 105307163 A | | 2/2016 | |
| CN | 105790938 A | | 7/2016 | |
| CN | 106254323 A | | 12/2016 | |
| CN | 106453196 A | | 2/2017 | |
| CN | 106506472 A | | 3/2017 | |
| CN | 106576239 A | | 4/2017 | |
| CN | 107027115 A | | 8/2017 | |
| CN | 114762290 A | * | 7/2022 | H04L 63/045 |
| EP | 3101607 A1 | | 12/2016 | |

OTHER PUBLICATIONS

Xu, Q., "Application of Secure Chip in the Instant Messaging System," Technical Frontier, Mar. 2014, 3 pages.

Di Pietro, R., et al., "A Two-Factor Mobile Authentication Scheme for Secure Financial Transactions," International Conference on Mobile Business (ICMB'05), Jul. 11-13, 2005, 7 pages.

Vijayakumar, P., et al., "Dual Authentication and Key Management Techniques for Secure Data Transmission in Vehicular Ad Hoc Networks," IEEE Transactions on Intelligent Transportation Systems, vol. 17, Issue: 4, Apr. 2016, pp. 1015-1028.

"Global Platform Card Specification V2.3," Oct. 2015, 335 pages.

Liu, Y., "Research And Implementation of the Key Technology Accessing the SE Securely," Nov. 3, 2016, 89 pages.

Chunying, Y., "Research and Implement on Authentication of Internet of Vehicle," Jan. 10, 2016, 84 pages.

Zhang, Y., et al., "Research on RFID Authentication Technology Based on Two-way Authentication Protocol," Information Network Security, Jan. 31, 2016, 6 pages.

Meihong, L., et al., "SDKEY-based partition data protection of mobile terminal," Journal of Beijing Jiaotong University, vol. 37, No. 5, Oct. 2013, 4 pages.

Zhang, D., et al., "Security and Trusted Intelligent Mobile Terminal," ZTE Technology Journal, vol. 21, No. 5, Oct. 2015, pp. 39-44.

* cited by examiner

DATA PROCESSING METHOD AND APPARATUS

CROSS-REFERENCE TO RELATED APPLICATIONS

This application is a U.S. National Stage of International Patent Application No. PCT/CN2017/102105 filed on Sep. 18, 2017, which is hereby incorporated by reference in its entirety.

TECHNICAL FIELD

Embodiments of the present invention relate to communications field, and in particular, to a data processing method and apparatus.

BACKGROUND

An international standard organization global platform (global platform, GP) formulates specifications related to a card application management procedure in a secure element (secure element, SE). Card application management of the SE includes operations such as installation, deletion, update, and user data configuration (also referred to as personalization, personalization) for a card application (card application/applet) in the SE.

Currently, an online (online) management method is mainly used for the card application management of the SE. That is, a secure channel (secure channel) is established between a server and the SE in a terminal, and the server manages the card application in the SE by using the terminal. Delegated management (delegated management, DM) is a mode of performing online management on the SE. In the delegated management mode, the terminal cooperates with the server to create a security domain (security domain, SD) in the SE, and configures the SD, where a key of the SD and permission of the SD are configured. For example, if the configured SD has DM permission, the SD depends on an authorization code (token) verification function provided by the SE. In a broad sense, the SD is a special card application management entity that provides a service for the card application managed by the SD. When the server manages a card application in a target SD, the server sends card content management indication information to the target SD through a secure channel between the server and the SE. The card content management indication information may include a card content management instruction and an authorization code corresponding to the card content management instruction. After receiving the card content management indication information, the target SD invokes the authorization code verification function provided by the SE, verifies the card content management instruction in the card content management indication information by using a key, and matches a verification result with the authorization code corresponding to the card content management instruction. The target SD executes the card content management instruction only after the matching succeeds.

In the prior art, operations related to the card application management, for example, the verification of the card content management instruction, are all performed in the SE (including the SD). However, the SE is a running environment in which computing resources are limited, and an operation procedure such as verification of the card content management instruction involved in the DM mode leads to low efficiency of the SD in executing the card content management indication information. However, if a part of the operation procedure in the SD is directly transferred to an entity in another running environment for execution, security may deteriorate significantly.

SUMMARY

Embodiments of the present invention provide a data processing method and an apparatus, which are used to provide a trust basis for transferring a part of an operation procedure of an SD to another entity.

According to a first aspect, an embodiment of the present invention provides a data processing method, the method includes the following steps:

A trusted application TA entity checks whether a target security domain SD corresponding to a target card application is bound, and if the target security domain SD is bound, the TA entity sends a certificate and a private key signature of the TA entity to the target SD, where the target SD is an SD in a secure element SE. After receiving the certificate and the private key signature, the target SD forwards the certificate and the private key signature to a server, and the server performs trust verification on the TA entity according to the certificate and the private key signature. When the trust verification of the TA entity succeeds, the target SD or the server sends a first key of the target SD to the TA entity.

In this way, after the target SD cooperates with the server to perform the trust verification on the TA entity, the TA entity obtains the first key of the target SD, so that the TA entity establishes a trust relationship with the target SD, thereby providing a trust basis for transferring a part of a procedure of the SD to the TA entity.

In a possible implementation, the method further includes the following steps:

The TA entity obtains, from the server, card content management indication information that includes a first card content management instruction and an authorization code, where a correspondence exists between the first card content management instruction and the authorization code. The TA entity decrypts the authorization code based on the first key, and the TA entity calculates and verifies the first card content management instruction by invoking a signature verification algorithm to obtain a verification credential. Then, the TA entity matches the verification credential with the decrypted authorization code. When the matching succeeds, the TA entity sends the first card content management instruction to the target SD.

In this way, for the card content management indication information delivered by the server, the TA entity decrypts the authorization code according to the obtained first key, and the TA entity calculates and verifies the first card content management instruction in the card content management indication information, and matches the verification credential obtained through verification with the decrypted authorization code. The TA entity sends only the first card content management instruction that succeeds in verification and matching to the target SD. Because the target SD establishes the trust relationship with the TA entity, the target SD can directly execute the first card content management instruction after receiving the first card content management instruction sent by the TA entity, thereby improving execution efficiency of the terminal.

In another possible implementation, after obtaining the verification credential and the decrypted authorization code through verification and calculation, the TA entity sends all of the verification credential, the decrypted authorization code, and the first card content management instruction to the target SD, and then the target SD matches the verification credential with the decrypted authorization code. If the matching succeeds, the target SD executes the first card content management instruction. In this way, the TA entity performs only a procedure of verification and calculation to obtain the verification credential and the decrypted authorization code, and a procedure of matching the verification credential with the decrypted authorization code is still performed by the target SD, thereby improving verification security.

In another possible implementation, before the TA entity obtains the card content management indication information sent by the server, the TA entity may further first check whether the first key is valid. When the first key is invalid, the TA entity sends request information to the target SD, to request to obtain a new key. After receiving the request information, the target SD applies to the server for the new key. The server sends a response message to the target SD, where the response message includes the new key. The target SD sends key update information including the new key to the TA entity. After receiving the key update information, the TA entity updates the locally stored first key with the new key.

In this way, before verifying the card content management indication information delivered by the server, the TA entity first checks whether the locally stored first key is valid, and if the locally stored first key is invalid, the TA entity obtains the new key from the target SD, thereby improving verification accuracy.

In another possible implementation, the method further includes the following steps:

The TA entity obtains, from the terminal, local card application operation information used to perform a management operation on the target card application. The TA entity generates a second card content management instruction and an authorization code based on the first key and the card application operation information. The TA entity sends the second card content management instruction and the authorization code to the target SD.

In this way, the TA entity is able to generate the card content management instruction and the authorization code, so that the TA entity cooperates with the target SD to complete a local operation to the terminal, without depending on the server to generate the card content management instruction and the authorization code, thereby improving execution efficiency of the terminal.

According to a second aspect, an embodiment of the present invention provides a data processing method, the method includes the following steps:

A target security domain SD receives a certificate of a trusted application TA entity and a private key signature of the TA entity from the TA entity, where the target SD is an SD in a secure element SE, and the target SD corresponds to a target card application. The target SD sends the certificate of the TA entity and the private key signature of the TA entity to a server, where the certificate of the TA entity and the private key signature of the TA entity are used by the server to perform trust verification on the TA entity. The target SD receives a response message from the server when the trust verification of the TA entity succeeds, and sends a first key of the target SD to the TA entity.

In a possible implementation, after receiving the response message sent by the server, the target SD may further determine, based on the response message, whether the trust verification of the TA entity succeeds. When determining that the trust verification of the TA entity succeeds, the target SD sends the first key to the TA entity. When determining that the trust verification of the TA entity fails, the target SD does not send the first key to the TA entity.

In this way, for a case that the server sends the response message to the target SD even if the trust verification of the server to the TA entity fails, the target SD may confirm, based on the response message, that the trust verification of the TA entity succeeds or fails again, thereby improving security of trust binding between the target SD and the TA entity.

According to a third aspect, an embodiment of the present invention provides a data processing method, the method includes the following steps:

A trusted application TA entity sends an integrity credential of the TA entity to a target security domain SD, where the integrity credential is used by the target SD to perform trust verification on the TA entity. The TA entity receives acknowledgement information from the target SD when the trust verification of the TA entity succeeds, where the acknowledgement information is used to instruct the target SD to establish a trust association with the TA entity, and the acknowledgement information includes a first key of the target SD.

According to a fourth aspect, an embodiment of the present invention provides a data processing method, the method includes the following steps:

A target security domain SD receives an integrity credential of a trusted application TA entity from the TA entity. The target SD obtains a root certificate corresponding to the TA entity. The target SD verifies the integrity credential based on the root certificate. After the verification succeeds, the target SD sends acknowledgement information to the TA entity, where the acknowledgement information is used to instruct the target SD to establish a trust association with the TA entity, and the acknowledgement information includes a first key of the target SD.

In this way, the target SD may perform trust verification on the TA entity according to the root certificate invoked from the SE, without depending on the server to perform trust verification on the TA entity, thereby improving verification efficiency.

According to a fifth aspect, an embodiment of the present invention provides a data processing apparatus. The apparatus is a trusted application TA entity, and the apparatus has a same function as the TA entity in the method according to the first aspect or the third aspect. The function may be implemented by hardware, or may be implemented by hardware executing corresponding software. The hardware or the software includes one or more modules corresponding to the functions.

According to a sixth aspect, an embodiment of the present invention provides a data processing apparatus, where the apparatus is a target security domain SD, and the apparatus has a same function as the target SD in the method according to the second aspect or the fourth aspect. The function may be implemented by hardware, or may be implemented by hardware executing corresponding software. The hardware or the software includes one or more modules corresponding to the functions.

According to a seventh aspect, an embodiment of the present invention provides a data processing apparatus, where the apparatus is a trusted application TA entity and includes: a processor, a memory, a transceiver. The processor, the memory, and the transceiver are connected by using a bus. The memory stores a computer instruction. The processor executes the computer instruction to implement the method according to the first aspect or the third aspect.

According to an eighth aspect, an embodiment of the present invention provides a data processing apparatus, where the apparatus is a target security domain SD and includes: a processor, a memory, a transceiver. The processor, the memory, and the transceiver are connected by using a bus. The memory stores a computer instruction. The processor executes the computer instruction to implement the method according to the second aspect or the fourth aspect.

According to a ninth aspect, an embodiment of the present invention provides a readable storage medium, where the storage medium stores a computer instruction used to implement the method described in the first aspect, the second aspect, the third aspect, or the fourth aspect.

According to a tenth aspect, an embodiment of the present invention provides a computer program product. The computer program product includes a computer software instruction. The computer software instruction may be loaded by a processor to implement a procedure in any one of the methods according to the first aspect, the second aspect, the third aspect, the fourth aspect, or the fifth aspect.

According to an eleventh aspect, an embodiment of the present invention provides a data processing system. The system may include the TA entity in the first aspect and the target SD in the second aspect, or the TA entity in the third aspect and the target SD in the fourth aspect.

According to a twelfth aspect, an embodiment of the present invention provides a chip apparatus. The chip apparatus includes a processor and a memory. The processor is connected to the memory. The processor may run an instruction stored in the memory, so that the chip apparatus performs the method described in the first aspect or the third aspect.

According to a thirteenth aspect, an embodiment of the present invention provides a chip apparatus. The chip apparatus includes a processor and a memory. The processor is connected to the memory. The processor may run an instruction stored in the memory, so that the chip apparatus performs the method described in the second aspect or the fourth aspect.

According to a fourteenth aspect, an embodiment of the present invention provides a chip apparatus. The chip apparatus includes a processor and a memory. The processor is connected to the memory. The processor may run an instruction stored in the memory, so that the chip apparatus performs the methods described in the first aspect and the second aspect. Alternatively, the processor may run the instruction stored in the memory, so that the chip apparatus performs the methods described in the third aspect and the fourth aspect.

In the embodiments of the invention, after a target SD cooperates with a server to perform trust verification on a TA entity, the TA entity establishes a trust relationship with the target SD, thereby providing a trust basis for transferring a part of a procedure of the target SD to the TA entity. After the TA entity receives card content management indication information sent by the server, the TA entity performs a procedure of verifying the card content management indication information, and the target SD only needs to execute a card content management instruction after the verification succeeds, thereby improving execution efficiency of the target SD. The TA entity may further generate a card content management instruction and an authorization code according to the obtained first key, so that the TA entity cooperates with the target SD to execute a local operation instruction, without depending on a need of generating the card content management instruction and the authorization code by the server, thereby improving execution efficiency of the terminal.

DESCRIPTION OF EMBODIMENTS

Embodiments of the present invention provide a data processing method and a related apparatus, which are used to provide a trust basis for transferring a part of an operation procedure of an SD to another entity. The following clearly and completely describes technical solutions in the embodiments of the present invention with reference to accompanying drawings in the embodiments of the present invention.

Figure 1:
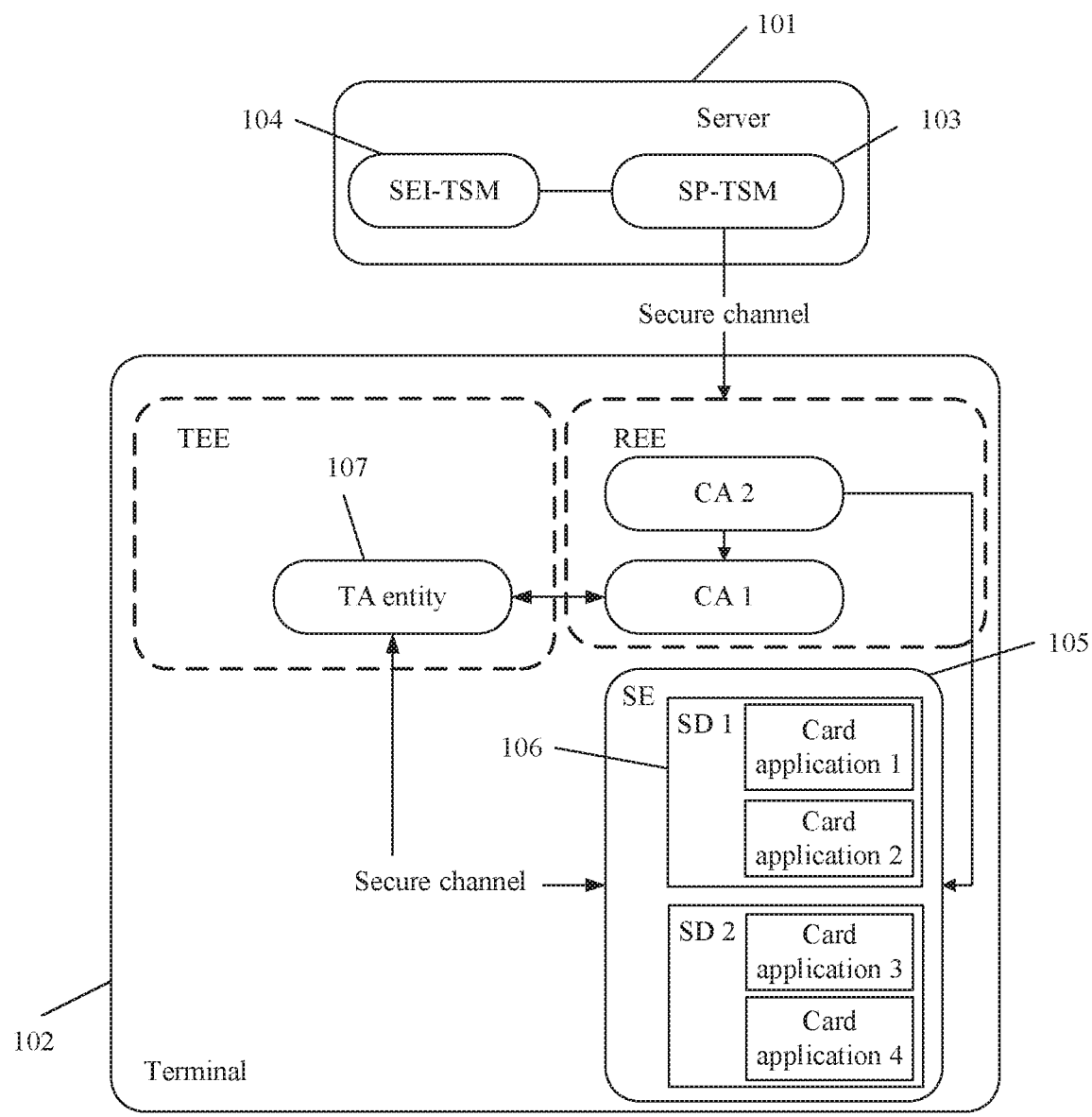
FIG. 1 is a schematic diagram of a system architecture to which a data processing method according to an embodiment of the present invention is applied.

FIG. 1 is a schematic diagram of a system architecture to which a data processing method according to an embodiment of the present invention is applied. The system architecture in FIG. 1 includes an entity device on a server 101 side and an entity device on a terminal 102 side. The entity device on the server 101 side includes a service provider-trusted service manager (service provider-trusted service manager, SP-TSM) 103 and a secure element issuer-trusted service manager (English: secure element issuer-trusted service manager. SEI-TSM) 104. The entity device on the terminal 102 side includes an SE 105 and an SD (including an SD 1 and an SD 2 in the figure) deployed in the SE 105. For example, the SEI-TSM 104 is configured to generate, by using a key, an authorization code for an SD created by the server, and the SP-TSM 103 is configured to communicate with the SE 105 in the terminal 102, and manage a card application (including a card application 1, a card application 2, a card application 3, and a card application 4 in the figure) installed in the SE 105. Before installing a target card application managed by the server 101, the terminal 102 first needs to create an SD (referred to as a target SD 106 below, and the SD 1 is taken as an example of the target SD 106 in the figure) corresponding to the SP-TSM 103 in the SE 105. The SP-TSM 103 sends a request to the SEI-TSM 104 for installing the target SD 106, and the SEI-TSM 104 responds to the request of the SP-TSM 103. The SEI-TSM 103 establishes a secure channel between the SEI-TSM 104 and the SE 105 (a channel that is encrypted and signed by using the key to ensure confidentiality and integrity) by using the key possessed by the SEI-TSM 104, and sends a creation script of the target SD 106 to the SE 105. The SE 105 executes the creation script, to create the target SD 106 in the SE 105, and configure permission and a key of the target SD 106. For example, the SE 105 may execute an attribute setting instruction in the creation script, and configure the target SD 106 as an SD in a DM mode. The SE 105 may generate data by using the key provided in the creation script, and invoke an algorithm supported by the SE 105 to generate an RSA (rivest-shamir-adleman encryption) key. The SE 105 may also configure the key for the target SD 106 in other manners, for example, directly obtain the key generated by the SP-TSM 103 from the SEI-TSM through the secure channel. This key will subsequently be used by the SP-TSM 103 to establish a secure channel dedicated to the target SD 106, with the target SD 106. The SP-TSM 103 can manage one or more card applications. When the SP-TSM 103 installs the card application for the target SD 106, the SP-TSM 103 establishes the secure channel with the target SD 106, and sends card content management indication information to the target SD 106 through the secure channel. The target SD 106 invokes an authorization code verification function provided by the SE 105, to verify card content management instruction in the card content management indication information, and an authorization code corresponding to the card content management instruction. After the verification succeeds, the target SD 106 executes the card content management instruction, to complete a management operation on the card application.

The SE 105 is a key factor for implementing a mobile payment service (for example, mobile payment of a mobile phone) in a terminal. The SE 105 is a tamper resistant platform, and is generally a chip with a security microcontroller. The SE 105 can securely provide a running environment for an application and confidential data or a key of the application (for example, key management) according to a security requirement and a rule proposed by an authoritative and trusted entity. Therefore, the SE 105 provides a running and storage environment with a tamper resistant (tamper resistant) capability and a cryptographic operation function. The SE 105 may be configured to install, run a payment application, and save confidential data such as a key and a certificate.

The SD 106 is an entity for providing support for control, security, and a communication requirement function in entities other than the SE 105 (for example, an SE provided by an SE issuer, an application developer, or an authoritative certification authority). The SD 106 is deployed in the SE 105 and corresponds to a server of an operator or a service provider server (SP-TSM in the server). In this embodiment of the present invention, the SD 106 is configured to manage the target card application managed by the server. When the server delivers the card content management indication information to the terminal, the SD 106 in the terminal executes a command in the card content management indication information, for example, performs operations such as installation, deletion, update, and user data configuration. In this embodiment of the present invention, the SE 105 and the SD 106 may be a specific physical component, or may be a functional module in the terminal, for example, may be an SE integrated in an SIM card, an embedded SE welded to a main board, an SE integrated in a micro SD card, or an SE module integrated in a central processing unit (central processing unit, CPU) of the terminal. This is not limited in this embodiment of the present invention.

The terminal in this embodiment of the present invention further includes a trusted execution environment (trusted execution environment, TEE). The TEE may be a TEE implemented based on ARM's Trustzone technology, or may be a TEE implemented based on Intel's trusted computing technology or another technology. This is not limited in this embodiment of the present invention. The trusted execution environment is a running environment isolated from a CPU of the terminal by using an isolation technology. The trusted execution environment may include hardware and software, and is configured to provide an isolated and trusted running and storage environment for the application. A trusted application (trusted application, TA) entity 107 is deployed in the trusted execution environment, and the TA entity 107 is configured to provide a security-related function for a client application in a rich execution environment (rich execution environment, REE). The TA entity 107 may be a specific physical component, or may be a functional module in the terminal. The TEE and the SE may be connected by using a bus. For example, the TEE and the SE may be connected to the bus by using an I2C, an SPI, or a universal asynchronous receiver/transmitter (universal asynchronous receiver/transmitter, UART).

Because computing resources of the SE are limited, the SD has low efficiency in processing the card content management indication information. To improve execution efficiency of the SD, in this embodiment of the present invention, some SD computing work is allocated to the TA entity in the trusted execution environment for execution. For example, the TA entity verifies the card content management indication information (in the DM mode, the card content management indication information includes a card content management instruction and a corresponding authorization code) delivered by the server, and after determining that the verification of the card content management indication information succeeds, the TA entity sends a management instruction in the card content management indication information to the SD. In this way, the SD only needs to perform a related operation on the management instruction, and does not need to verify the card content management indication information before the card content management indication information is executed, thereby improving execution efficiency of the SD. Before the foregoing functions are implemented, the SD needs to establish a trust relationship with the TA entity, so that when receiving the card content management instruction sent by the TA entity, the SD may determine that the card content management instruction is valid and trusted.

Figure 2:
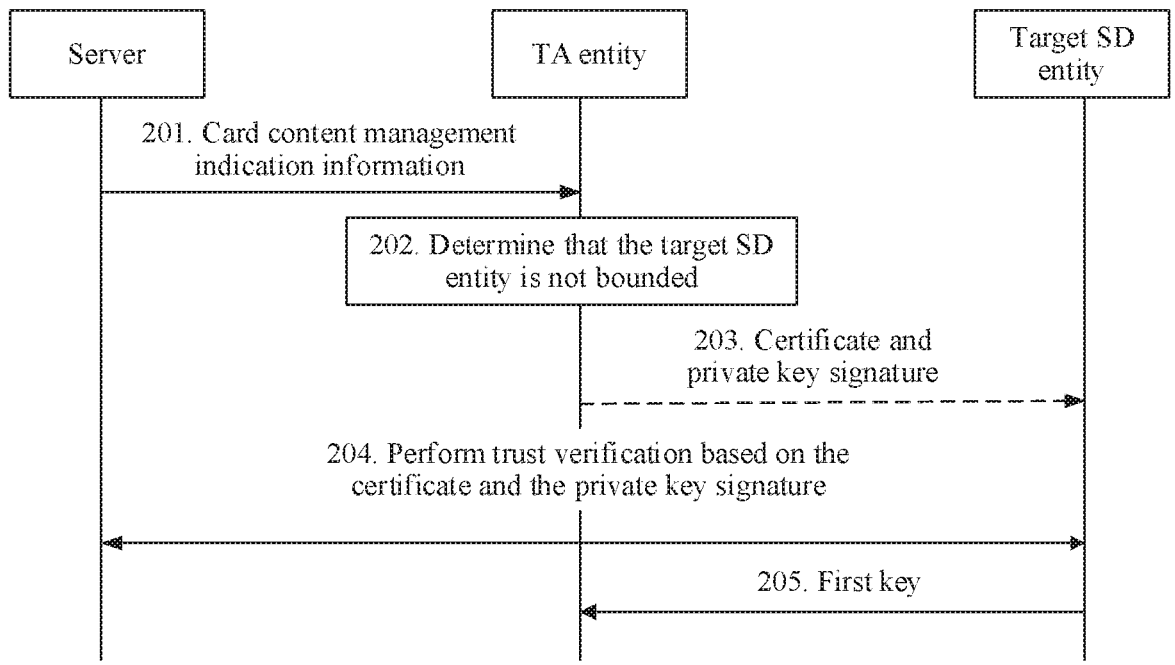
FIG. 2 is a schematic diagram of a data processing method according to an embodiment of the present invention.

Referring to FIG. 2, an example of a data processing method according to an embodiment of the present invention is described. FIG. 2 shows an interaction procedure in which a target SD establishes trust with a TA entity. Before this procedure is performed, an SE already creates the target SD corresponding to a server (an SP-TSM in the server), and configures the target SD as a DM mode. When the target SD is created or after the target SD is created, an exclusive authorization code verification key is configured for the target SD in the SE. Correspondingly, an SEI-TSM stores an authorization code generation key corresponding to the SP-TSM. In this way, in response to a request of the SP-TSM, the SEI-TSM generates an authorization code for a card content management instruction generated by the SP-TSM.

201. The server sends card content management indication information to the TA entity.

When the server needs to manage a target card application in the target SD of a terminal, the server pushes card content management indication information to the terminal. For example, the SP-TSM in the server pushes the card content management indication information to the terminal. The card content management indication information includes the card content management instruction and an authorization code corresponding to the card content management instruction. The TA entity in the terminal receives the card content management indication information. The card content management indication information further carries an identification (identification) of the target SD corresponding to the target card application.

Optionally, the user may also trigger locally at the terminal to obtain the card content management indication information. For example, the user discovers an application update prompt by using a user interface of the terminal, and when the user operates on the terminal to update the application, the terminal obtains the card content management indication information from the SP-TSM.

Optionally, when the server does not obtain an identification of the TA entity, the server cannot directly send the card content management indication information to the TA entity. Therefore, the server may send the card content management indication information to another entity in the terminal, such as the SE of the terminal or an entity other than the TEE of the terminal. For example, the server sends the card content management indication information to a client application (client application, CA) entity installed in an REE (as shown in FIG. 1, the CA entity in FIG. 1 includes a CA 1 entity and a CA 2 entity), and then the CA entity forwards the card content management indication information to the TA entity. When configuring the TA entity in the TEE of the terminal to service the SE, the server also installs the CA entity in the REE of the terminal. Therefore, the CA entity may invoke an application programming interface (Application Programming Interface, API) provided by the REE, and receive various notification messages from the SP-TSM by using the CA entity, including the card content management indication information. After receiving the card content management indication information, the CA entity forwards the card content management indication information to the TA entity. Optionally, to establish a secure channel between the SP-TSM and the SE, the terminal may preset or install later an entity in the REE, for example, the CA entity. The CA entity is configured to provide the API for an entity (for example, the TA entity in the TEE) other than the REE to invoke. Therefore, the TA entity may further invoke the API of the CA entity, to receive the card content management indication information sent by the server.

202. The TA entity determines that the TA entity is not bound to the target SD.

The TA entity determines, according to the identification of the target SD in the card content management indication information, whether the TA entity is bound to the target SD. For example, the TA entity stores a list of binding relationship with multiple SDs, and the list of binding relationship includes multiple identifications of the multiple SDs that establish the binding relationship with the TA entity. After obtaining the identification of the target SD entity, the TA entity searches the list of binding relationship for the identification of the target SD. If the identification of the target SD exists, it indicates that the TA entity is bound, and if the identification of the target SD does not exist, it indicates that the TA is not bound. If the TA entity is bound to the target SD, the card content management indication information is verified (the verification process is described in the subsequent embodiment); if the TA entity is not bound to the target SD, steps 103 to 105 are performed. When establishing the binding relationship with the target SD, the TA entity stores the identification ID of the target SD, so that when subsequently receiving the card content management indication information, the TA entity may confirm whether the target SD included in the card content management indication information is already bound.

203. The TA entity sends a certificate and a private key signature of the TA entity to the target SD.

To verify the card content management indication information, the TA entity needs to obtain a first key corresponding to the target SD, that is, a verification key corresponding to the authorization code of the target SD. The target SD needs to trust the TA entity to send the first key to the TA entity. To obtain trust of the target SD, the TA entity needs to send the certificate and the private key signature of the TA entity to the target SD, and the target SD performs trust verification.

Optionally, when the TA entity does not establish a direct communication connection to the target SD, the TA entity may send the certificate and the private key signature of the TA entity to the SE, and the SE forwards the certificate and the private key signature to the target SD.

The private key signature may be obtained by the TA entity using its private key to sign a challenge included in the card content management indication information. The challenge may be a string of random numbers.

204. The target SD sends the certificate and the private key signature of the TA entity to the server for the trust verification.

The target SD may send the certificate and the private key signature of the TA entity to the server, and the server verifies the certificate of the TA entity and the private key signature of the TA entity. After receiving the certificate and the private key signature of the TA entity, the server first uses a root certificate preset in the server (for example, an operator of the server has a cooperation relationship with another terminal operator; and therefore, the server presets a root certificate used to verify the certificate of the TA entity of the another terminal operator) to verify the certificate of the TA entity, then obtains a public key from the TA entity certificate, and verifies the private key signature according to the public key. The server verifies the certificate in multiple manners. For example, the server may perform verification in a manner such as determining whether the certificate is a certificate issued by a valid digital certificate authentication authority. This is not limited in this embodiment of the present invention. After the verification performed on the certificate and the private key signature of the TA entity succeeds, the server notifies the target SD, to indicate that the TA entity is a trusted TA entity. The following describes an example in which the server verifies the certificate and the private key signature of the TA entity in this embodiment of the present invention.

After receiving the certificate and the private key signature of the TA entity, the server invokes, according to attribute information included in the certificate of the TA entity, a root certificate of an issuer corresponding to the certificate. For example, if the certificate of the entity TA is issued by an authoritative certificate management authority, the server needs to invoke a preset root certificate of the authority certificate management authority. Alternatively, if the certificate of the TA entity is issued by a vendor, the server needs to invoke a preset root certificate of the vendor (the vendor and the server are in a cooperation relationship by using an offline cooperation protocol, and the root certificate of the vendor is preset on the server). The server obtains a public key in the root certificate, and verifies the certificate of the TA entity by using the public key in the root certificate. For example, the server uses the public key to verify an encrypted ciphertext included in the certificate of the TA entity, to obtain a decrypted plaintext, and compares the decrypted plaintext with a plaintext included in the certificate of the TA entity (the certificate of the TA entity includes a plaintext and a ciphertext of a public key x, where the ciphertext of the public key x is encrypted by using a private key corresponding to the public key of the root certificate). If they are consistent, it indicates that the certificate is not tampered with, and if they are inconsistent, it indicates that the certificate may be tampered with. The server verifies private key signature data by using the public key derived from the certificate of the TA entity. For example, if the private key signature data includes a segment of plaintext and a ciphertext that is obtained by encrypting this plaintext with the private key of the TA entity, the server may decrypt the segment of ciphertext by using a public key derived from the certificate of the TA entity, and compare the plaintext obtained through decryption with the plaintext carried in the signature data. If they are consistent, it indicates that the private key signature data is correct and complete, and if they are inconsistent, it indicates that the private key signature data is incomplete. After determining that the certificate of the TA entity is not tampered with and the private key signature data is complete, the server determines that the certificate of the TA entity is valid, and determines that the TA entity is a trusted entity.

Optionally, the trust verification performed by the server for the TA entity may be: The SP-TSM receives and verifies the certificate and the private key signature of the TA entity, and then sends a request to the SEI-TSM to obtain a credential. The credential is used to request the SE for an authorization code verification key corresponding to the target SD. Alternatively, the SP-TSM sends the certificate and the private key signature of the TA entity to the SEI-TSM, and the SEI-TSM performs verification on the certificate and the private key signature of the TA entity. After the verification succeeds, the SEI-TSM sends a credential to the SP-TSM. Finally, the SP-TSM sends a message to the target SD for confirming that the TA entity is trusted, and the message includes the credential.

When the server determines that the certificate of the TA entity is valid and determines that the private key signature data of the TA entity is complete, it indicates that trust verification performed by the server for the TA entity succeeds. The server sends a response message to the target SD. The response message indicates that the trust verification of the TA entity succeeds. After receiving the response message, the target SD determines, based on the response message, that the trust verification of the TA entity succeeds. Optionally, if the server fails to perform the trust verification on the TA entity, the server may not send the response message to the target SD, and the target SD does not receive the response message after a preset time period, confirming that the trust verification of the TA entity fails. Optionally, even if the server fails to perform the trust verification on the TA entity, the server still sends the response message to the target SD. The response message indicates that the verification performed on the TA entity fails. After receiving the response message, the target SD determines, according to an indication in the response message, that the trust verification of the TA entity fails.

205. The target SD sends the first key of the target SD to the TA entity.

After receiving the response message, the target SD determines that the trust verification of the TA entity succeeds, and the target SD sends, to the TA entity, the first key that is corresponding to the target SD and that is used to verify the card content management instruction and the authorization code. In this way, the TA entity obtains the verification credential according to the first card content management instruction. For example, the TA entity described in subsequent embodiments calculates the card content management instruction in the card content management instruction information by invoking a signature verification algorithm to obtain the verification credential. The TA entity decrypts the authorization code based on the first key. The TA entity then matches the verification credential with the decrypted authorization code. If the matching succeeds, it indicates that the card content management instruction is a trusted instruction, and if the matching fails, it indicates that the card content management instruction is an untrusted instruction.

Optionally, before the target SD sends the first key to the TA entity, the target SD obtains an obtaining credential of the authorization code verification key from the server, and requests the first key from the SE by using the credential. After obtaining the first key, the target SD sends the first key to the TA entity.

Optionally, in a possible implementation, a root certificate may be preset in the SE. After the target SD receives the certificate and the private key signature that are sent by the TA entity, the target SD invokes the preset root certificate from the SE to verify the certificate of the TA entity, and then verifies the private key signature of the TA entity by using the certificate of the TA entity. If the verification on the certificate and the private key signature of the TA entity succeeds, the target SD sends, to the TA entity, the first key obtained from the SE.

Optionally, the target SD may generate a symmetric key, encrypt the first key by using the symmetric key, encrypt the symmetric key by using the public key derived from the certificate of the TA entity, and send the encrypted symmetric key, the first key, and a corresponding encryption algorithm type to the TA entity. The TA entity obtains the symmetric key through decryption by using the private key of the TA entity, then obtains the first key through decryption by using the symmetric key, and stores the first key in the TEE. In this way, the target SD sends the first key to the TA entity in an encryption manner, to prevent the first key from being leaked to another entity, thereby improving security of key transmission.

Optionally, the first key sent by the target SD to the TA entity may further include a validity period. The validity period may be a valid time, and the valid time may be a preset time period. For example, the first key is valid before 00:00:00 on Oct. 1, 2017. Optionally, the validity period may be a quantity of use times, and the quantity of validity times may be a preset quantity of times. For example, the first key may be used to verify the authorization code for 10 times, and the first key becomes invalid after 10 verifications. The preset time period and the preset quantity of times may be determined according to a specific situation. This is not limited in this embodiment of the present invention.

Optionally, in another possible implementation, the TA entity may not send the certificate and the private key signature to the target SD. The TA entity may obtain, from a TEE operating system (operating system, OS), an integrity credential of the TA entity that is signed by using a TEE certificate. Because the TEE can be based on a read-only memory (read-only memory, ROM), when the TEE is started, integrity of the TA entity may be checked by using read-only code (for example, a segment of code for verifying a signature of each TA entity) in the ROM, and a signature function and a signature function (for example, a private key and a TEE certificate are preset at delivery of the TEE, and an integrity check result is signed by using a private key corresponding to the TEE certificate) provided by the code in the ROM can be used, to obtain the integrity credential of the TA entity. The TA entity sends the integrity credential to the target SD by using the SE. The root certificate for verifying the TEE certificate is preset in the SE. The target SD invokes the root certificate from the SE and verifies an integrity credential signed by the TEE certificate. After the verification succeeds, the target SD sends acknowledgement information to the TA entity, where the acknowledgement information instructs the target SD to establish a trust association with the TA entity. The acknowledgement message includes the first key of the target SD.

In this embodiment of the present invention, the target SD performs trust verification on the certificate and the private key signature of the TA entity. After the verification succeeds, it indicates that the target SD determines that the TA entity is trusted. The target SD sends the first key to the TA entity, so that the TA entity may perform a part of an operation procedure of the target SD based on the first key, thereby providing a secure basis for transferring the part of the operation procedure of the target SD.

Figure 3:
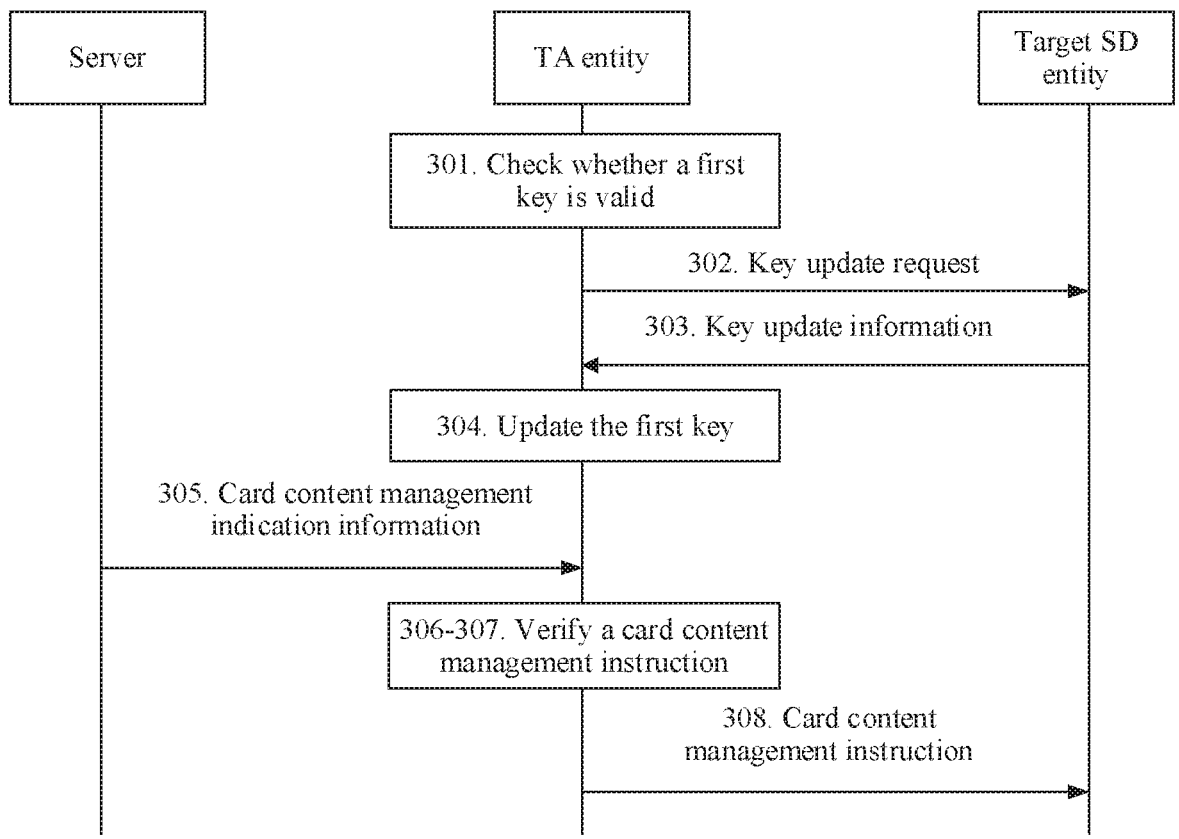
FIG. 3 is a schematic diagram of another data processing method according to an embodiment of the present invention.

The embodiment of FIG. 2 describes a process in which the TA entity establishes trust with the target SD. The following describes a procedure of verifying the card content management indication information after the TA entity establishes the trust with the SD. A procedure of an embodiment in FIG. 3 is based on the embodiment in FIG. 2. After the TA entity establishes the trust relationship with the target SD, the TA entity verifies card content management indication information sent by the server. As shown in FIG. 3, another data processing method provided in this embodiment of the present invention includes the following steps.

301. The TA entity checks whether the first key of the target SD is valid.

The TA entity may check, in multiple manners, whether the first key is valid, for example, determine whether the use time period of the first key exceeds the preset time period, or determine whether the quantity of use times of the first key exceeds the preset quantity of times. For example, the first key includes the validity period. If the validity period is a preset time period, and the preset time period is 00:00:00 on Oct. 1, 2017, the TA entity checks whether a current time is before 00:00:00 on Oct. 1, 2017. If yes, the TA entity determines that the first key is valid; if not, the TA entity determines that the first key is invalid. Alternatively, if the validity period is a preset quantity of times, and the preset quantity of times is 10, the TA entity checks the quantity of use times the first key is used to perform verification in a historical record. If the quantity of times does not reach 10, the TA entity determines that the first key is valid. If the quantity of times reaches 10, the TA entity determines that the first key is invalid.

When the TA entity checks that the first key is invalid, step 302 is performed. When the TA entity checks that the first key is valid, step 305 is performed.

302. The TA entity sends a key update request to the target SD.

When the TA entity checks that the stored first key is invalid, a new key needs to be obtained from the target SD. Optionally, the key update request may include the certificate and the private key signature of the TA entity, so that the target SD confirms an identity of the TA entity.

303. The target SD sends key update information to the TA entity.

After receiving the key update request sent by the TA entity, the target SD determines whether the first key is updated. If the first key is updated, the target SD sends an updated first key to the TA entity. If the first key is not updated, the target SD requests the server to update the first key, and sends the updated first key to the TA entity.

The target SD determines whether the first key is updated. The target SD may determine whether a version number of the first key included in the key update request sent by the TA matches with a version number that is stored in the SE and that is of the authorization code verification key corresponding to the target SD. If the versions are consistent, it indicates that the first key is not updated. If the versions are inconsistent, it indicates that the first key is updated. If the first key in the SE is not updated, the target SD sends a key update request to the server, and the SEI-TSM configures the first key with a new version for the target SD in the SE. In addition, the SEI-TSM updates a corresponding authorization code generation key.

Optionally, after receiving the key update request, the target SD does not need to determine whether the first key is updated, but directly sends the key update request to the server. The server sends the new key (also referred to as a second key) to the SE, and the SE forwards the new key to the target SD, and notifies the target SD that the key is updated. The target SD then sends the new key to the TA entity.

304. The TA updates the first key based on the key update information.

After receiving the key update information, the TA entity updates the stored first key of the target SD based on the key update information. For example, after receiving the key update information, the TA entity parses out the new key and the version number of the new key that are in the key update information, and the TA entity matches the version number of the new key with the version number of the first key locally stored in the TA entity. If a matching result is inconsistent, the TA entity replaces the locally stored first key with the new key. If the matching result is consistent, the TA entity does not need to update the first key. Optionally, the TA entity may not determine whether the version number of the new key matches with the version number of the first key, but directly replace the locally stored first key with the new key. Because the new key is a key currently sent by the target SD, the new key is consistent with the key of the server, so that the TA entity only needs to use the new key.

Optionally, after updating the first key, the TA entity may further implement a key security rule. For example, a quantity of use times or a use time period of the updated first key is recorded, and when the quantity exceeds the preset quantity of use times, or the use time period expires, the TA entity needs to update the first key again. Optionally, the first key stored in the TA entity includes the key version number.

305. The TA entity obtains the card content management indication information.

The card content management indication information may be sent by the server to the TA entity, or may be triggered when the user operates the terminal. The card content management indication information includes the card content management instruction (which may also be referred to as the first card content management instruction) and the authorization code corresponding to the card content management instruction, and the authorization code may be a token in the foregoing example.

It should be noted that step 305 may be performed before step 301. In other words, the TA entity first obtains the card content management indication information, and then determines whether the first key is valid. No limitation is imposed in this embodiment of the present invention.

306. The TA entity obtains the verification credential according to the card content management instruction, and decrypts the authorization code based on the first key.

The TA entity calculates and verifies the card content management instruction by invoking the signature verification algorithm supported by the TEE to obtain the verification credential, and decrypts the authorization code based on the first key. For example, the TA entity invokes a hash algorithm supported by the TEE, to perform a hash operation on the card content management instruction (excluding the authorization code). A result of the hash operation is used as the verification credential, and the verification credential may be represented in a form of a group of bit strings. Then, the TA entity performs a decryption operation on the authorization code by using the first key, to obtain a plaintext of the authorization code. The plaintext obtained after performing the decryption operation on the authorization code may be represented in a form of a group of bit strings.

307. The TA entity matches the verification credential with the decrypted authorization code.

Because the card content management indication information is a message to be sent by the server to the target SD, and is used by the target SD to execute according to the card content management instruction of the card content management indication information, and the authorization code in the card content management indication information has an association relationship with the first key of the target SD, the target SD can invoke an authorization code verification function provided by the SE to determine whether the card content management indication information is a valid message. Therefore, after obtaining the corresponding verification credential by verifying and calculating the card content management instruction, the TA entity may match the verification credential with the decrypted authorization code corresponding to the card content management instruction. If the matching succeeds, it indicates that the card content management instruction is valid. If the matching fails, it indicates that the card content management instruction is invalid. For example, the TA entity compares the verification credential with the plaintext obtained by decrypting the authorization code by using the first key, and the TA entity determines whether the verification credential is consistent with the plaintext. If the verification credential is consistent with the plaintext, it indicates that the matching succeeds. If the verification credential is inconsistent with the plaintext, it indicates that the matching fails.

It should be noted that a group of card content management indication information may include a plurality of card content management instructions and a plurality of authorization codes corresponding to the plurality of card content management instructions. The authorization code may be included in the card content management instruction and sent to the target SD together with the card content management instruction. Alternatively, the authorization code and the card content management instruction may be sent to the target SD separately. When verifying the plurality of card content management instructions, the TA entity needs to: obtain the corresponding verification credential according to each card content management instruction, decrypt, by using the first key, the authorization code corresponding to each card content management instruction, and match each verification credential with the decrypted authorization code corresponding to the card content management instruction.

In an actual operation process, the card content management indication information may be tampered with or incorrectly transmitted. For an invalid card content management instruction, the terminal may prompt, by using the user interface, the user that an error occurs or notify the user card application that management is abnormal. When a verification result of a card content management instruction in the group of card content management information is invalid, the terminal should prompt the user to abandon or reset the current card content management operation.

308. The TA entity sends the card content management instruction to the target SD when the verification credential matches with the decrypted authorization code.

When the verification credential of each instruction matches with the plaintext of the authorization code of the instruction, it indicates that the card content management instruction included in the card content management indication information is valid, and the TA entity sends the card content management instruction in the card content management indication information to the target SD one by one, so that the target SD executes a related management operation according to the card content management instruction. Because the target SD establishes the trust relationship with the TA entity, the target SD stores the identification of the TA. When receiving the card content management instruction, the target SD first determines whether the card content management instruction is sent by the TA entity that establishes the trust relationship. If the card content management instruction is sent by the TA, the target SD executes the card content management instruction. If the card content management instruction is not sent by the TA, the target SD does not execute the card content management instruction.

Optionally, in a possible implementation, step 307 is an optional step. After obtaining the verification credential by calculating and the decrypted authorization code, the TA entity may not match the verification credential with the decrypted authorization code, but send all of the verification credential obtained by calculating, the decrypted authorization code, and the card content management indication instruction to the target SD. The target SD matches the verification credential with the decrypted authorization code (in other words, determines, through comparison, whether the verification credential is consistent with the plaintext of the authorization code). If the matching succeeds, the target SD executes the card content management instruction.

In this embodiment, the TA entity obtains the card content management indication information sent by the server, and verifies the card content management instruction in the card content management indication information based on the first key of the target SD, and matches the verification credential with the authorization code. The TA entity sends the card content management instruction that is successfully verified to the target SD. Because the target SD establishes the trust relationship with the TA entity, the target SD determines that the card content management instruction sent by the TA entity is trusted, and the target SD executes the card content management instruction. In this way, the TA entity verifies the card content management indication information, and the target SD only needs to execute the received card content management instruction, thereby improving execution efficiency of the target SD.

Figure 4:
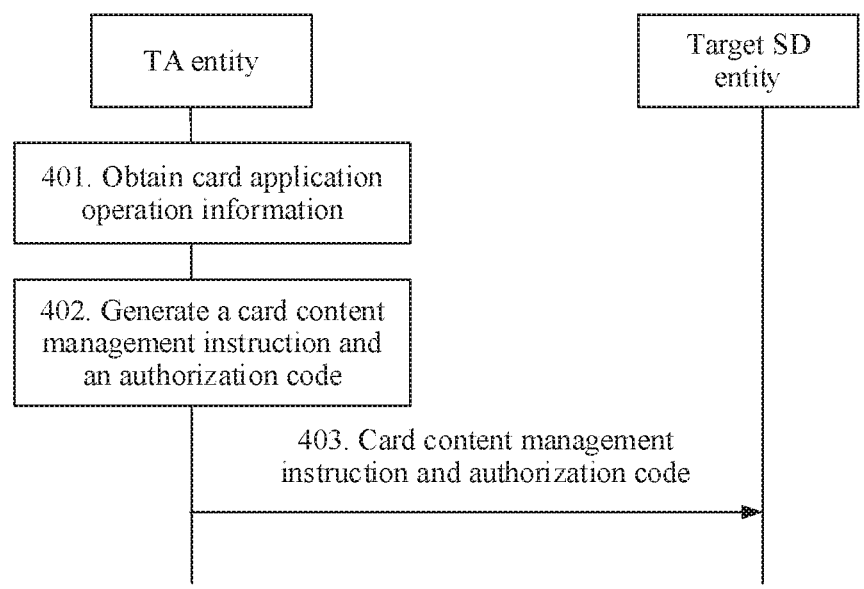
FIG. 4 is a schematic diagram of another data processing method according to an embodiment of the present invention.

In the embodiment in FIG. 3, the process in which the TA entity verifies the card content management indication information delivered by the server is described. This embodiment of the present invention further provides an implementation in which the terminal side performs a local card application management operation independently of the server. In the prior art, relevant management operations of the card application in the SD in the terminal need be jointly completed under cooperation of the server side. That is, the user cannot perform the local management operation on the card application in the SD in the terminal. In view of this, an embodiment of the present invention provides a corresponding solution. Referring to FIG. 4, an example of another data processing method provided in this embodiment of the present invention is described.

In this embodiment in FIG. 4, a TA entity first needs to establish a trust relationship with a target SD, and a manner of establishing trust by the TA entity is similar to that of the embodiment in FIG. 2. A difference lies in that, in the embodiment in FIG. 2, the first key is sent to the TA entity by using the target SD, and in the embodiment in FIG. 4, when a server determines that a certificate and a private key signature of the TA entity are valid, the server directly negotiates a key with the TA entity to establish a secure channel, and the server sends a first key of the target SD to the TA entity. The server notifies the target SD that the TA entity can be trusted. In the embodiment in FIG. 4, the first key is used by the TA entity to generate an authorization code for the target SD, and after the TA entity establishes trust with the target SD, the following steps are performed:

401. The TA entity obtains card application operation information from a terminal.

When a user performs a management operation on a target card application in the target SD in the terminal (for example, deleting the target card application, or modifying a state of whether the card application is selectable, or modifying other attributes of the card application), the terminal is triggered to generate the card application operation information, the TA entity obtains the card application operation information. It should be noted that the card application operation information in this embodiment is different from the card content management indication information in the foregoing embodiment. The card content management indication information includes the card content management instruction and the authorization code corresponding to the card content management instruction that are generated by the server, and the card application operation information is a corresponding operation instruction generated by the terminal when the user performs a behavior operation on the terminal (for example, an instruction for deleting, an instruction for modifying a state, or an instruction for modifying an attribute), where the card application operation information does not include a card content management instruction and an authorization code. In this embodiment, the card content management instruction and the authorization code are generated by the TA entity.

402. The TA entity generates the corresponding card content management instruction and authorization code according to the obtained first key and card application operation information.

In this embodiment, because the TA entity obtains the first key of the target SD that is sent by the server, after obtaining the card application operation information (for example, information for deleting, or information for modifying a state, or information for modifying an attribute), the TA entity may generate the corresponding card content management instruction and authorization code based on the first key and the card application operation information, so that the target SD can perform a related operation.

For example, the TA entity may generate, according to the received card application operation information that includes the user attempting to delete the card application, a DELETE instruction that includes the authorization code. The target SD may receive the instruction and verify the authorization code, and execute the instruction.

Alternatively, the TA entity may generate, according to the received card application operation information that includes the user attempting to modify a card application selection state, an INSTALL FOR MAKE SELECTABLE instruction that includes the authorization code. The target SD may receive the instruction and verify the authorization code, and execute the instruction.

Alternatively, the TA entity may generate, according to the received card application operation information that includes the user attempting to modify the card application attribute, the INSTALL FOR REGISTRY UPDATE instruction that includes the authorization code. The target SD may receive the instruction and verify the authorization code, and execute the instruction.

It should be noted that, a function of the first key obtained by the TA entity in this embodiment is different from that of the first key in the embodiment in FIG. 3. In the embodiment in FIG. 3, the first key is used by the TA entity to verify the card content management instruction and the authorization code. The first key in this embodiment is used by the TA entity to generate the authorization code of the card content management instruction.

Optionally, the TA entity generates, in multiple manners, the card content management instruction and the authorization code for the card application operation information based on the first key sent by the server. For example, the server configures various generation templates of the card content management instruction and the authorization code in the TA entity in advance, for example, a template for deleting, a template for modifying the state, or a template for modifying the attribute. After obtaining the card application operation information, the TA entity searches for, according to an identification of the target card application included in the card application operation information, an identification of the target SD corresponding to the target card application. Further, the TA entity determines the first key according to the identification of the target SD (the TA entity may store multiple keys corresponding to multiple SDs), and then searches for a generation template corresponding to the card application operation information. For example, the TA entity analyzes that the card application operation information is information that the user deleting the card application in the target SD, and the TA entity searches for the template for deleting in the multiple generation templates. Then, the TA entity generates the corresponding card content management instruction (also referred to as a second card content management instruction) and the authorization code based on the first key and the generation template (also referred to as a first generation template). The TA entity instantiates the generation template based on the card application operation information and data about the authorization code. For example, the identification of the target card application to be operated by the TA entity is filled into the generation template, and the authorization code of the card application operation instruction is generated by using the first key and filled into the generation template, so that the generation template is complete and becomes an executable instance.

403. The TA entity sends the card content management instruction and the authorization code to the target SD.

After generating the card content management instruction and the authorization code, the TA entity sends the card content management instruction and the authorization code to the target SD. The target SD invokes an authorization code verification function provided by an SE, calculates a verification credential for the card content management instruction, and matches the verification credential with the authorization code. If the matching succeeds, it indicates that the operation instruction is valid, and the target SD executes the card content management instruction. Optionally, a manner in which the TA entity sends the card content management instruction and the authorization code to the target SD may be that the TA entity sends multiple card content management instructions and corresponding authorization codes in the first generation template that is filled and complete to the target SD one by one.

In this embodiment, the TA entity establishes the trust relationship with the target SD, and the TA entity has a capability of generating the card content management instruction and the authorization code. Through the solution of this embodiment of the present invention, the process of generating the card content management instruction and the authorization code is transferred to the trusted TA entity in the terminal, so that a local operation of the terminal does not need to depend on the server, and the TA entity may cooperate with the target SD to complete the related local operation. This reduces dependence of the terminal on the server, and improves execution efficiency of the terminal.

Figure 5:
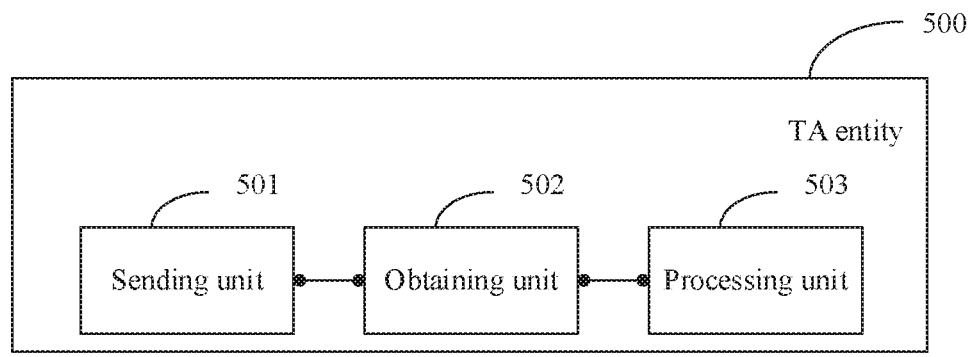
FIG. 5 is a schematic diagram of a data processing apparatus according to an embodiment of the present invention.

Referring to FIG. 5, an example of a data processing apparatus according to an embodiment of the present invention is described. The apparatus is a TA entity 500, and includes:

a sending unit 501, configured to send a certificate of the TA entity and a private key signature of the TA entity to a target security domain SD, where the target SD is an SD in a secure element SE, the target SD corresponds to a target card application, and the certificate of the TA entity and the private key signature of the TA entity are used by the target SD to perform trust verification via a server, and an obtaining unit 502, configured to obtain a first key of the target SD when the trust verification of the TA entity succeeds.

Optionally, the obtaining unit 502 is further configured to obtain card content management indication information sent by the server, where the card content management indication information includes a first card content management instruction and an authorization code.

The apparatus 500 further includes:

a processing unit 503, configured to obtain a verification credential according to the first card content management instruction, and decrypt the authorization code based on the first key.

The processing unit 503 is further configured to match the verification credential with the decrypted authorization code.

The sending unit 501 is further configured to send the first card content management instruction to the target SD when the verification credential matches with the decrypted authorization code.

Optionally, the obtaining unit 502 is further configured to obtain the card content management indication information sent by the server, where the card content management indication information includes a first card content management instruction and an authorization code.

The processing unit 503 is further configured to obtain the verification credential according to the first card content management instruction, and decrypt the authorization code based on the first key.

The sending unit 501 is further configured to send the verification credential, the decrypted authorization code, and the first card content management instruction to the target SD.

Optionally, the processing unit 503 is further configured to: before the obtaining unit obtains the card content management indication information sent by the server, check whether the first key is valid.

The obtaining unit 502 is further configured to obtain key update information from the target SD when the first key is invalid.

The processing unit 503 is further configured to update the first key based on the key update information.

Optionally, the obtaining unit 502 is further configured to obtain card application operation information from the terminal, where the card application operation information is used to perform a management operation on a target card application.

The processing unit 503 is further configured to generate a second card content management instruction and an authorization code based on the first key and the card application operation information.

The sending unit 501 is further configured to send the second card content management instruction and the authorization code to the target SD.

Optionally, the processing unit 503 is specifically configured to:

determine a first generation template based on the card application operation information, where the first generation template is a template configured by the server in the TA entity, and the first generation template corresponds to the card application operation information; and generate the second card content management instruction and the authorization code based on the first key and the first generation template, and write the generated second card content management instruction and authorization code into the first generation template.

Optionally, the sending unit 501 is specifically configured to:

send the certificate of the TA entity and the private key signature of the TA entity to the secure element SE, and send the certificate of the TA entity and the private key signature of the TA entity to the target SD.

When running, the units described in the embodiment of FIG. 5 may further perform steps performed by the TA entity in any embodiment of FIG. 2 to FIG. 4. For detailed content, refer to the embodiments of FIG. 2 to FIG. 4. Details are not described herein.

Figure 6:
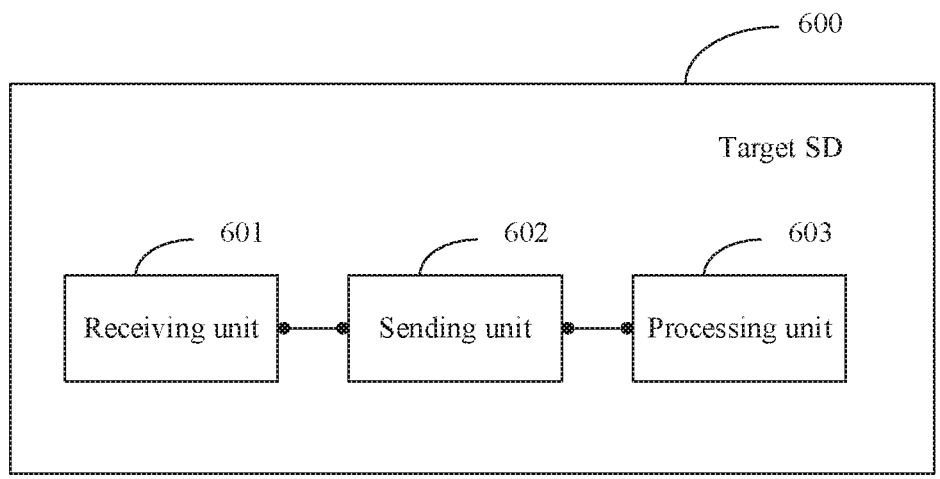
FIG. 6 is a schematic diagram of another data processing apparatus according to an embodiment of the present invention.

Referring to FIG. 6, an example of another data processing apparatus according to an embodiment of the present invention is described. The apparatus is a target SD 600 and includes:

a receiving unit 601, configured to receive a certificate of a trusted application TA entity and a private key signature of the TA entity from the TA entity, where the target SD is an SD in a secure element SE, and the target SD corresponds to a target card application; and a sending unit 602, configured to send the certificate of the TA entity and the private key signature of the TA entity to a server, where the certificate of the TA entity and the private key signature of the TA entity are used by the server to perform trust verification on the TA entity.

The receiving unit 601 is further configured to receive a response message from the server when the trust verification of the TA entity succeeds.

The sending unit 602 is further configured to send a first key of the target SD to the TA entity.

Optionally, the receiving unit 601 is further configured to receive a key update request from the TA entity, where the key update request is used to update the first key stored in the TA entity.

The apparatus further includes:

a processing unit 603, configured to obtain a second key from the server based on the key update request.

The sending unit 602 is further configured to send the second key to the TA entity.

Optionally, the processing unit 603 is further configured to determine, based on the response message, whether the trust verification of the TA entity succeeds.

The sending unit 602 is further configured to send the first key of the target SD to the TA entity when the trust verification of the TA entity succeeds.

When running, the units described in the embodiment of FIG. 6 may further perform steps performed by the target SD in any embodiment of FIG. 2 to FIG. 4. For detailed content, refer to the embodiments of FIG. 2 to FIG. 4. Details are not described herein.

Figure 7:
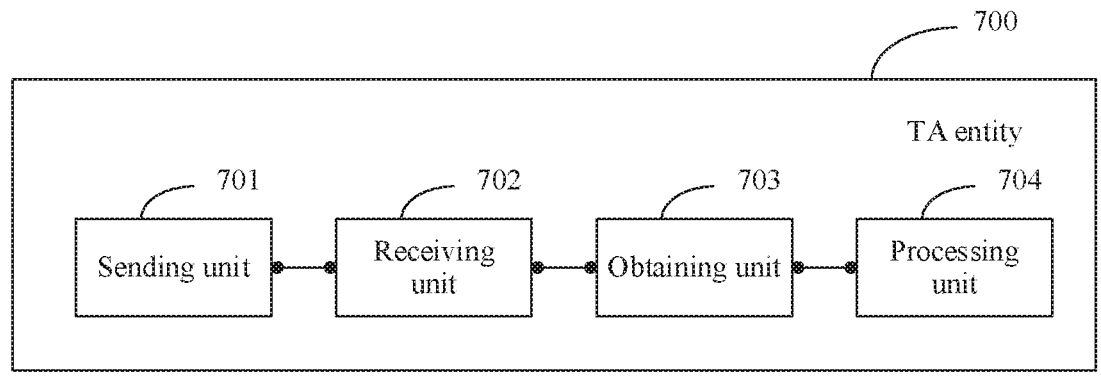
FIG. 7 is a schematic diagram of another data processing apparatus according to an embodiment of the present invention.

Referring to FIG. 7, an example of another data processing apparatus according to an embodiment of the present invention is described. The apparatus is a TA entity 700 and includes:

a sending unit 701, configured to send an integrity credential of the TA entity to a target security domain SD, where the integrity credential is used by the target SD to perform trust verification on the TA entity; and a receiving unit 702, configured to receive acknowledgement information from the target SD when the trust verification of the TA entity succeeds, where the acknowledgement information is used to instruct the target SD to establish a trust association with the TA entity, and the acknowledgement information includes a first key of the target SD.

Optionally, the apparatus further includes:

an obtaining unit 703, configured to obtain card content management indication information sent by the server, where the card content management indication information includes a first card content management instruction and an authorization code; and the processing unit 704, further configured to obtain a verification credential according to the first card content management instruction, and decrypt the authorization code based on the first key.

The processing unit 704 is further configured to match the verification credential with the decrypted authorization code.

The sending unit 701 is further configured to send the first card content management instruction to the target SD when the verification credential matches with the decrypted authorization code.

Optionally, the obtaining unit 702 is further configured to obtain the card content management indication information sent by the server, where the card content management indication information includes the first card content management instruction and the authorization code.

The processing unit 704 is further configured to obtain the verification credential according to the first card content management instruction, and decrypt the authorization code based on the first key.

The sending unit 701 is further configured to send the verification credential, the decrypted authorization code, and the first card content management instruction to the target SD.

Optionally, the processing unit 704 is further configured to: before the obtaining unit obtains the card content management indication information sent by the server, check whether the first key is valid.

The obtaining unit 703 is further configured to obtain key update information from the target SD when the first key is invalid.

The processing unit 704 is further configured to update the first key based on the key update information.

Optionally, the obtaining unit 703 is further configured to obtain card application operation information from the terminal, where the card application operation information is used to perform a management operation on a target card application.

The processing unit 704 is further configured to generate a second card content management instruction and an authorization code based on the first key and the card application operation information.

The sending unit 701 is further configured to send the second card content management instruction and the authorization code to the target SD.

Optionally, the processing unit 704 is specifically configured to:

determine a first generation template based on the card application operation information, where the first generation template is a template configured by the server in the TA entity, and the first generation template corresponds to the card application operation information; and generate the second card content management instruction and the authorization code based on the first key and the first generation template, and write the generated second card content management instruction and authorization code into the first generation template.

Optionally, the sending unit 701 is specifically configured to:

send the integrity credential of the TA entity to a secure element SE, and send the integrity credential of the TA entity to the target SD.

When running, the units described in the embodiment of FIG. 7 may further perform steps performed by the TA entity in any embodiment of FIG. 2 to FIG. 4. For detailed content, refer to the embodiments of FIG. 2 to FIG. 4. Details are not described herein.

Figure 8:
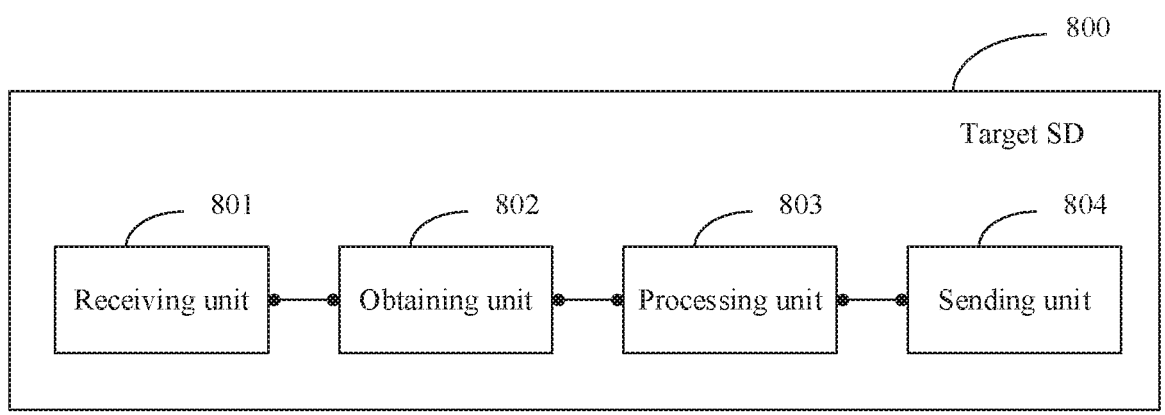
FIG. 8 is a schematic diagram of another data processing apparatus according to an embodiment of the present invention.

Referring to FIG. 8, an example of another data processing apparatus according to an embodiment of the present invention is described. The apparatus is a target SD 800 and includes:

a receiving unit 801, configured to receive an integrity credential of a trusted application TA entity from the TA entity;

an obtaining unit 802, configured to obtain a root certificate corresponding to the TA entity:

a processing unit 803, configured to verify the integrity credential based on the root certificate; and a sending unit 804, configured to send acknowledgement information to the TA entity after the verification succeeds, where the acknowledgement information is used to instruct the target SD to establish a trust association with the TA entity, and the acknowledgement information includes a first key of the target SD.

Optionally, the obtaining unit 802 is further configured to obtain a second key from the server based on the key update request.

The sending unit 804 is further configured to send the second key to the TA entity.

When running, the units described in the embodiment of FIG. 8 may further perform steps performed by the target SD in any embodiment of FIG. 2 to FIG. 4. For detailed content, refer to the embodiments of FIG. 2 to FIG. 4. Details are not described herein.

The apparatuses described in the embodiments of FIG. 5 to FIG. 8 can also be implemented in another form.

Figure 9:
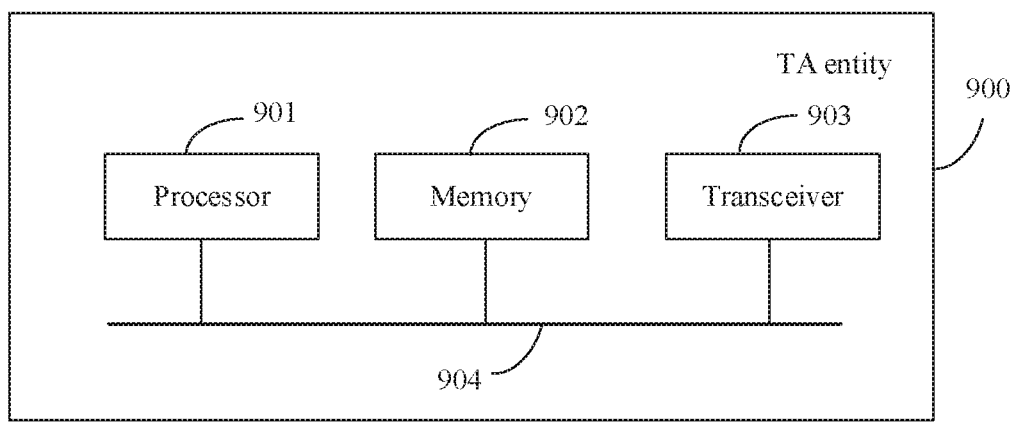
FIG. 9 is a schematic diagram of another data processing apparatus according to an embodiment of the present invention.

Referring to FIG. 9, an example of a data processing apparatus according to an embodiment of the present invention is described. The apparatus is a TA entity 900, and includes: a processor 901, a memory 902, and a transceiver 903. The processor 901, the memory 902, and the transceiver 903 are connected by using a bus 904. The transceiver 903 may include a transmitter and a receiver. The memory 902 stores a computer instruction. The processor 901 executes the computer instruction to implement the following:

The transceiver 903 sends a certificate of a TA entity and a private key signature of the TA entity to a target security domain SD, where the target SD is an SD in a secure element SE, the target SD corresponds to a target card application, and the certificate of the TA entity and the private key signature of the TA entity are used by the target SD to perform trust verification via a server.

The transceiver 903 obtains a first key of the target SD when the trust verification of the TA entity succeeds.

Optionally, the transceiver 903 obtains card content management indication information sent by the server, where the card content management indication information includes a first card content management instruction and an authorization code.

The processor 901 obtains a verification credential according to the first card content management instruction, and decrypts the authorization code based on the first key.

The processor 901 matches the verification credential with the decrypted authorization code, and when the verification credential matches with the decrypted authorization code, the transceiver 903 sends the first card content management instruction to the target SD.

Optionally, the transceiver 903 obtains the card content management indication information sent by the server, where the card content management indication information includes the first card content management instruction and the authorization code.

The processor 901 obtains the verification credential according to the first card content management instruction, and decrypts the authorization code based on the first key.

The transceiver 903 sends the verification credential, the decrypted authorization code, and the first card content management instruction to the target SD.

Optionally, before the transceiver 903 obtains the card content management indication information sent by the server, the processor 901 checks whether the first key is valid.

The transceiver 903 obtains key update information from the target SD when the first key is invalid.

The processor 901 updates the first key based on the key update information.

Optionally, the processor 901 obtains card application operation information from the terminal, where the card application operation information is used to perform a management operation on the target card application.

The processor 901 generates a second card content management instruction and an authorization code based on the first key and the card application operation information.

The transceiver 903 sends the second card content management instruction and the authorization code to the target SD.

Optionally, the processor 901 determines a first generation template based on the card application operation information, where the first generation template is a template configured by the server in the TA entity, and the first generation template corresponds to the card application operation information.

The processor 901 generates the second card content management instruction and the authorization code based on the first key and the first generation template, and writes the generated second card content management instruction and authorization code into the first generation template.

Optionally, the transceiver 903 sends the certificate of the TA entity and the private key signature of the TA entity to the secure element SE, and sends the certificate of the TA entity and the private key signature of the TA entity to the target SD.

When running, the units described in the embodiment of the present invention may further perform steps performed by the TA entity in any embodiment of FIG. 2 to FIG. 4. For detailed content, refer to the embodiments of FIG. 2 to FIG. 4. Details are not described herein.

Figure 10:
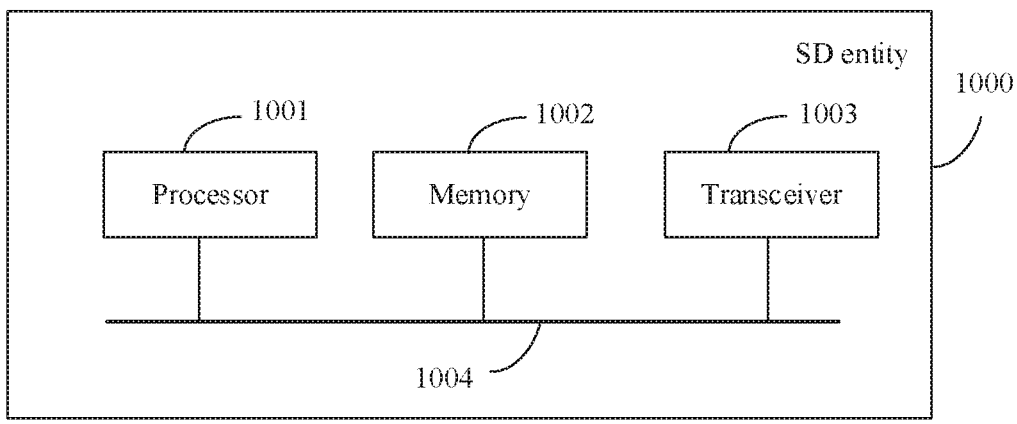
FIG. 10 is a schematic diagram of another data processing apparatus according to an embodiment of the present invention.

Referring to FIG. 10, an example of a data processing apparatus provided in an embodiment of the present invention is described. The apparatus is a target SD 1000 and includes: a processor 1001, a memory 1002, and a transceiver 1003. The processor 1001, the memory 1002, and the transceiver 1003 are connected by using a bus 1004. The transceiver 1003 may include a transmitter and a receiver. The memory 1002 stores a computer instruction. The processor 1001 executes the computer instruction to implement the following:

The transceiver 1003 receives a certificate of a trusted application TA entity and a private key signature of the TA entity from the TA entity, where the target SD is an SD in a secure element SE, and the target SD corresponds to a target card application.

The transceiver 1003 sends the certificate of the TA entity and the private key signature of the TA entity to a server, where the certificate of the TA entity and the private key signature of the TA entity are used by the server to perform trust verification on the TA entity.

The transceiver 1003 receives a response message from the server when the trust verification of the TA entity succeeds, and sends a first key of the target SD to the TA entity.

Optionally, the transceiver 1003 receives a key update request from the TA entity, where the key update request is used to update the first key stored in the TA entity.

The transceiver 1003 obtains a second key from the server based on the key update request.

The transceiver 1003 sends the second key to the TA entity.

Optionally, the processor 1001 determines, based on the response message, whether the trust verification of the TA entity succeeds. When the trust verification of the TA entity succeeds, the transceiver 1003 sends the first key of the target SD to the TA entity.

When running, the units described in the embodiment of the present invention may further perform steps performed by the target SD in any embodiment of FIG. 2 to FIG. 4. For detailed content, refer to the embodiments of FIG. 2 to FIG. 4. Details are not described herein.

Still referring to FIG. 9, an embodiment of the present invention provides another data processing apparatus. The apparatus is the TA entity 900, and includes: the processor 901, the memory 902, and the transceiver 903. The processor 901, the memory 902, and the transceiver 903 are connected by using the bus 904. The transceiver 903 may include the transmitter and the receiver. The memory 902 stores the computer instruction. The processor 901 executes the computer instruction to implement the following:

The transceiver 903 sends an integrity credential of the TA entity to a target security domain SD, where the integrity credential is used by the target SD to perform trust verification on the TA entity.

The transceiver 903 receives acknowledgement information from the target SD when the trust verification of the TA entity succeeds, where the acknowledgement information is used to instruct the target SD to establish a trust association with the TA entity, and the acknowledgement information includes a first key of the target SD.

Optionally, the transceiver 903 obtains card content management indication information sent by the server, where the card content management indication information includes a first card content management instruction and an authorization code.

The processor 901 obtains a verification credential according to the first card content management instruction, and decrypts the authorization code based on the first key.

The processor 901 matches the verification credential with the decrypted authorization code, and when the verification credential matches with the decrypted authorization code, the transceiver 903 sends the first card content management instruction to the target SD.

Optionally, the transceiver 903 obtains the card content management indication information sent by the server, where the card content management indication information includes the first card content management instruction and the authorization code.

The processor 901 obtains the verification credential according to the first card content management instruction, and decrypts the authorization code based on the first key.

The transceiver 903 sends the verification credential, the decrypted authorization code, and the first card content management instruction to the target SD.

Optionally, before the transceiver 903 obtains the card content management indication information sent by the server, the processor 901 checks whether the first key is valid.

The transceiver 903 obtains key update information from the target SD when the first key is invalid.

The processor 901 updates the first key based on the key update information.

Optionally, the processor 901 obtains card application operation information from the terminal, where the card application operation information is used to perform a management operation on the target card application.

The processor 901 generates a second card content management instruction and an authorization code based on the first key and the card application operation information.

The transceiver 903 sends the second card content management instruction and the authorization code to the target SD.

Optionally, the processor 901 determines a first generation template based on the card application operation information, where the first generation template is a template configured by the server in the TA entity, and the first generation template corresponds to the card application operation information.

The processor 901 generates the second card content management instruction and the authorization code based on the first key and the first generation template, and writes the generated second card content management instruction and authorization code into the first generation template.

Optionally, the transceiver 903 sends the integrity credential of the TA entity to the secure element SE, and sends the integrity credential of the TA entity to the target SD.

When running, the units described in the embodiment of the present invention may further perform steps performed by the TA entity in any embodiment of FIG. 2 to FIG. 4. For detailed content, refer to the embodiments of FIG. 2 to FIG. 4. Details are not described herein.

Still referring to FIG. 10, an embodiment of the present invention provides another data processing apparatus. The apparatus is a target SD 1000 and includes: a processor 1001, a memory 1002, and a transceiver 1003. The processor 1001, the memory 1002, and the transceiver 1003 are connected by using a bus 1004. The transceiver 1003 may include a transmitter and a receiver. The memory 1002 stores a computer instruction. The processor 1001 executes the computer instruction to implement the following:

The transceiver 1003 receives an integrity credential of a trusted application TA entity from the TA entity.

The processor 1001 obtains a root certificate corresponding to the TA entity.

The processor 1001 verifies the integrity credential based on the root certificate.

After the verification succeeds, the transceiver 1003 sends acknowledgement information to the TA entity, where the acknowledgement information is used to instruct the target SD to establish a trust association with the TA entity, and the acknowledgement information includes a first key of the target SD.

Optionally, the transceiver 1003 receives a key update request from the TA entity, where the key update request is used to update the first key stored in the TA entity.

The transceiver 1003 obtains a second key from the server based on the key update request.

The transceiver 1003 sends the second key to the TA entity.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

When running, the units described in the embodiment of the present invention may further perform steps performed by the target SD in any embodiment of FIG. 2 to FIG. 4. For detailed content, refer to the embodiments of FIG. 2 to FIG. 4. Details are not described herein.

An embodiment of the present invention further provides a data processing system. The system may be a terminal, and the terminal may be the terminal 102 shown in FIG. 1, the terminal may include various handheld devices, vehicle-mounted devices, wearable devices, or computing devices that have a wireless communication function, or other devices that are connected to a wireless modem and that have a data processing capability. The terminal (terminal) may be referred to as a mobile station (mobile station, MS for short), user equipment (user equipment), or a terminal device (terminal device), and may include a subscriber unit (subscriber unit), a cellular phone (cellular phone), a smartphone (smart phone), a wireless data card, a personal digital assistant (personal digital assistant. PDA) computer, a tablet computer, a wireless modem (modem), a handheld device (handheld), a laptop computer (laptop computer), a cordless phone (cordless phone) or a wireless local loop (wireless local loop, WLL) station, a machine type communication (machine type communication. MTC) terminal, or the like. The terminal includes the TA entity shown in the embodiment in FIG. 5 and the target SD shown in the embodiment in FIG. 6. Alternatively, the terminal may include the TA entity shown in the embodiment in FIG. 7 and the target SD shown in the embodiment in FIG. 8. In another form, the terminal may further include the TA entity shown in the embodiment in FIG. 9 and the target SD shown in the embodiment in FIG. 10.

An embodiment of the present invention further provides a chip apparatus. The chip apparatus includes a processing unit and a communications unit, and the chip apparatus includes the processing unit and the communications unit. Optionally, the chip apparatus further includes a storage unit, and the processing unit may run an instruction stored in the storage unit, so that the chip apparatus performs the steps performed by the TA entity and/or the target SD in any embodiment in FIG. 2 to FIG. 4.

An embodiment of the present invention further provides a chip apparatus, and the chip apparatus may be disposed inside a terminal. The chip apparatus includes: a processor and a communications unit. The processor may be various types of processors. The communications unit may be, for example, an input/output interface, a pin, or a circuit. The communications unit includes a system bus. Optionally, the chip further includes a memory, where the memory may be a memory inside the chip apparatus, for example, a register, a cache, a random access memory (random access memory, RAM), an EEPROM, or a FLASH. Alternatively, the memory may be a memory located outside the chip apparatus, and the memory may be various types of memories. The processor is connected to the memory, and the processor may run an instruction stored in the memory, so that the chip apparatus performs the steps performed by the TA entity and/or the target SD in any embodiment in FIG. 2 to FIG. 4.

The processor in the embodiments of this application may be a central processing unit (Central Processing Unit, CPU), a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a transistor logic device, a hardware component, or any combination thereof. The processor 780 may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. Optionally, the processor may include one or more processing units.

The memory in the embodiments of this application may include a volatile memory, for example, a random access memory (random access memory, RAM), a non-volatile dynamic random access memory (Nonvolatile Random Access Memory, NVRAM), a phase change random access memory (Phase Change RAM, PRAM), and a magnetoresistive random access memory (Magnetoresistive RAM, MRAM), and may further include a non-volatile memory, for example, at least one magnetic disk storage device, a read-only memory (read-only memory, ROM), an electrically erasable programmable read-only memory (Electrically Erasable Programmable Read-Only Memory, EEPROM), a flash memory device such as a NOR flash memory (NOR flash memory) or a NAND flash memory (NAND flash memory), a semiconductor device such as a solid-state drive (Solid State Disk, SSD).

In the specification, claims, and accompanying drawings of the embodiments of the present invention, the terms "first", "second", and so on are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

All or some of the foregoing embodiments of the present invention may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line. DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk or a magnetic tape), an optical medium (for example, a DVD), a semiconductor medium (for example, a solid-state drive), or the like. The foregoing descriptions are merely example implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing method implemented by a trusted application (TA) entity, the data processing method comprising:

sending a certificate of the TA entity and a private key signature of the TA entity to a target security domain (SD), wherein the target SD is in a secure element (SE), wherein the target SD corresponds to a target card application, and wherein the certificate and the private key signature enable the target SD to perform trust verification on the TA entity via a server; and obtaining a first key of the target SD when the trust verification of the TA entity succeeds.

2. The data processing method of claim 1, further comprising:

obtaining card content management indication information from the server, wherein the card content management indication information comprises a first card content management instruction and an authorization code;

obtaining a verification credential according to the first card content management instruction;

decrypting the authorization code based on the first key to obtain a decrypted authorization code;

matching the verification credential with the decrypted authorization code;

identifying that the verification credential matching the decrypted authorization code; and sending, in response to the identifying, the first card content management instruction to the target SD.

3. The data processing method of claim 2, wherein before obtaining the card content management indication information, the data processing method further comprises:

checking whether the first key is valid;

obtaining key update information from the target SD when the first key is invalid; and updating the first key based on the key update information.

4. The data processing method of claim 1, further comprising:

obtaining card content management indication information from the server, wherein the card content management indication information comprises a first card content management instruction and an authorization code;

obtaining a verification credential according to the first card content management instruction;

decrypting the authorization code based on the first key to obtain a decrypted authorization code; and sending the verification credential, the decrypted authorization code, and the first card content management instruction to the target SD.

5. The data processing method of claim 1, further comprising:

obtaining card application operation information from a terminal, wherein the card application operation information performs a management operation on the target card application;

generating a second card content management instruction and an authorization code based on the first key and the card application operation information; and sending the second card content management instruction and the authorization code to the target SD.

6. The data processing method of claim 5, further comprising:

determining a first generation template based on the card application operation information, wherein the first generation template is configured by the server in the TA entity, and wherein the first generation template corresponds to the card application operation information;

generating the second card content management instruction and the authorization code based on the first key and the first generation template; and writing the second card content management instruction and the authorization code into the first generation template.

7. The data processing method of claim 1, further comprising:

sending the certificate and the private key signature to the SE; and sending the certificate and the private key signature the target SD.

8. A data processing method implemented by a target security domain (SD), the data processing method comprising:

receiving a certificate of a trusted application (TA) entity and a private key signature of the TA entity from the TA entity, wherein the target SD is in a secure element (SE), and wherein the target SD corresponds to a target card application;

sending the certificate and the private key signature to a server to enable the server to perform trust verification on the TA entity;

receiving a response message from the server when the trust verification of the TA entity succeeds; and responsively sending a first key of the target SD to the TA entity.

9. The data processing method of claim 8, further comprising:

receiving a key update request from the TA entity, wherein the key update request comprises a request to update the first key stored in the TA entity;

obtaining a second key from the server based on the key update request; and sending the second key to the TA entity.

10. The data processing method of claim 8, further comprising:

determining, based on the response message, whether the trust verification of the TA entity succeeds; and sending the first key to the TA entity when the trust verification of the TA entity succeeds.

11. A trusted application (TA) entity comprising:

a memory configured to store instructions; and a processor coupled to the memory and configured to execute the instructions to:

send, using a transceiver, an integrity credential of the TA entity to a target security domain (SD) to enable the target SD to perform trust verification on the TA entity; and receive, using the transceiver, acknowledgement information from the target SD when the trust verification of the TA entity succeeds, wherein the acknowledgement information to instructs the TA entity to establish a trust association with the target SD, and wherein the acknowledgement information comprises a first key of the target SD.

12. The TA entity of claim 11, wherein the processor is further configured to execute the computer instructions to:

obtain card content management indication information from a server, wherein the card content management indication information comprises a first card content management instruction and an authorization code;

obtain a verification credential according to the first card content management instruction;

decrypt the authorization code based on the first key to obtain a decrypted authorization code;

match the verification credential with the decrypted authorization code;

identify that the verification credential matches the decrypted authorization code; and send, using the transceiver, the first card content management instruction to the target SD in response to the identifying.

13. The TA entity of claim 12, wherein before obtaining the card content management indication information, the processor is further configured to execute the computer instructions to:

check whether the first key is valid;

obtain key update information from the target SD when the first key is invalid; and update the first key based on the key update information.

14. The TA entity of claim 11, wherein the processor is further configured to execute the computer instructions to:

obtain card content management indication information from a server, wherein the card content management indication information comprises a first card content management instruction and an authorization code;

obtain a verification credential according to the first card content management instruction;

decrypt the authorization code based on the first key to obtain a decrypted authorization code; and send, using the transceiver, the verification credential, the decrypted authorization code, and the first card content management instruction to the target SD.

15. The TA entity of claim 11, wherein the processor is further configured to execute the computer instructions to:

obtain card application operation information from a terminal, wherein the card application operation information performs a management operation on a target card application;

generate a second card content management instruction and an authorization code based on the first key and the card application operation information; and send, using the transceiver, the second card content management instruction and the authorization code to the target SD.

16. The TA entity of claim 15, wherein before generating the second card content management instruction and the authorization code, the processor is further configured to execute the computer instructions to determine a first generation template based on the card application operation information, wherein the first generation template is configured by a server in the TA entity, and wherein the first generation template corresponds to the card application operation information.

17. The TA entity of claim 16, wherein the processor is further configured to execute the computer instructions to generate the second card content management instruction and the authorization code based on the first key and the first generation template.

18. The TA entity of claim 17, wherein the processor is further configured to execute the computer instructions to write the second card content management instruction and the authorization code into the first generation template.

19. The TA entity of claim 18, wherein the processor is further configured to execute the computer instructions to send, using the transceiver, the integrity credential to a secure element (SE).

20. The TA entity of claim 19, wherein the processor is further configured to execute the computer instructions to send, using the transceiver, the integrity credential to the target SD.

* * * * *

UNITED STATES PATENT AND TRADEMARK OFFICE
CERTIFICATE OF CORRECTION

PATENT NO. : 11,552,807 B2
APPLICATION NO. : 16/648126
DATED : January 10, 2023
INVENTOR(S) : Guoqing Li et al.

It is certified that error appears in the above-identified patent and that said Letters Patent is hereby corrected as shown below:

In the Claims

Claim 8, Column 30, Line 21: "card application;" should read "SD card application;"

Signed and Sealed this
Twenty-first Day of February, 2023

Katherine Kelly Vidal
*Director of the United States Patent and Trademark Office*